United States Patent
Farwell et al.

(10) Patent No.: US 6,775,248 B1
(45) Date of Patent: Aug. 10, 2004

(54) PROGRAMMABLE BANDWIDTH ALLOCATION BETWEEN SEND AND RECEIVE IN A DUPLEX COMMUNICATION PATH

(75) Inventors: William D. Farwell, Thousand Oaks, CA (US); Micahel D. Vahey, Manhattan Beach, CA (US); Kenneth E. Prager, Granite Bay, CA (US); James T. Whitney, Sherman Oaks, CA (US)

(73) Assignee: Raytheon Company, Waltham, MA (US)

( * ) Notice: Subject to any disclaimer, the term of this patent is extended or adjusted under 35 U.S.C. 154(b) by 754 days.

(21) Appl. No.: 09/654,641

(22) Filed: Sep. 5, 2000

(51) Int. Cl.$^7$ ............................................. G06F 13/00
(52) U.S. Cl. ...................................... 370/282; 370/465
(58) Field of Search ................................ 370/276, 282, 370/382, 464, 465, 466, 476

(56) References Cited

U.S. PATENT DOCUMENTS 5,699,532 A * 12/1997 Barrett et al. ................ 710/305
6,167,466 A * 12/2000 Nguyen et al. ............... 710/30

* cited by examiner

Primary Examiner—Chi Pham
Assistant Examiner—Derrick W Ferris
(74) Attorney, Agent, or Firm—Leonard A. Alkov

(57) ABSTRACT

A communication path includes N channels or information pathways, each of which is bidirectional, i.e. each channel may be set to either send or receive. The number of send channels (S) and receive channels (R) is programmably set, such that S+R=N. The total bandwidth is N*B, where B is the bandwidth of each channel, and the send and receive bandwidths can be adjusted to any values such that $N*B \geq (S*B+R*B)$, on an as-needed basis depending on the processing algorithms being executed.

4 Claims, 2 Drawing Sheets

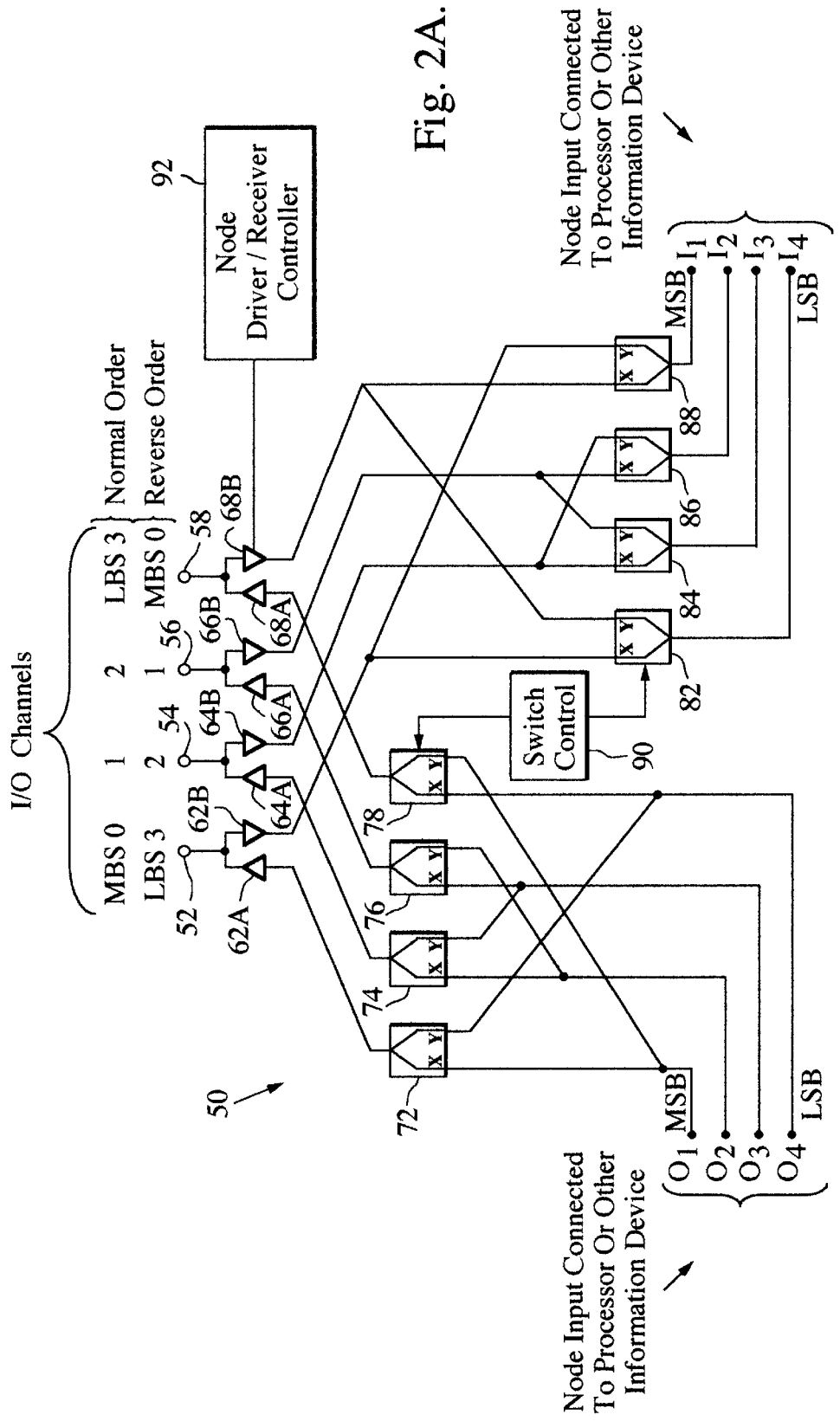

PROGRAMMABLE BANDWIDTH ALLOCATION BETWEEN SEND AND RECEIVE IN A DUPLEX COMMUNICATION PATH

This invention was made with Government support under a Government contract. The Government has certain rights in this invention.

TECHNICAL FIELD OF THE INVENTION

This invention relates to duplex communication paths, and more particularly to techniques for programmably allocating bandwidth between send and receive functions.

BACKGROUND OF THE INVENTION

When two processors (A and B) communicate, the required data rates from A to B and From B to A may vary, depending on the processing being performed. In known systems, the bandwidth of each direction of communication is fixed and must be set by design of the maximum necessary value. If the send and receive bandwidth requirements are never simultaneously maximum, then there is wasted bandwidth (e.g. extra cost) in the system.

SUMMARY OF THE INVENTION

The invention applies to a communication path including N channels, each of which is bidirectional, i.e. each channel may be set to either send or receive. A channel typically includes a transmission line (electrical or optical), but could by any independent information pathway, such as a radio frequency channel.

In accordance with an aspect of the invention, the number of send channels (S) and receive channels (R) is programmably set, such that S+R=N. Thus, for channels of equal bandwidth B, the send bandwidth is S*B, the receive bandwidth is R*B, and the ratio of send bandwidth to receive bandwidth is S/R.

The invention allows bandwidth to be optimally used. The total available bandwidth for this example is N*B, and the send and receive bandwidths can be adjusted to any values such that (S*B+R*B)≦N*B on an as-needed basis, depending on the processing algorithms being executed.

The invention provides several advantages. One advantage is simplicity of implementation. There is the ability to statically "set and forget" the number of channels in each direction for the entire duration of a processing mode, and then reset the number for the next mode. This is advantageous to a known method of bandwidth allocation by time-multiplexing between send and receive. The elimination of the need for continuous, dynamic switching between send and receive is particularly helpful where the communication path goes through multiple relays or crossbar switches between source and destination processors. Each relay or crossbar can be statically set for a long period, rather than requiring complex, dynamic timing of each channel's bidirectional mode.

Another advantage is reduced overhead and buffering requirements, as compared to time-multiplexing techniques. There is no turn-around time overhead, and no additional input/output (I/O) buffer memories, since the preset send and receive channels can be continuous.

A further advantage is a more efficient redundancy provision as compared to fixed allocations of send and receive bandwidth. A spare channel may be used by either send or receive, as needed, to provide a spare for both the send and receive channels.

BRIEF DESCRIPTION OF THE DRAWING

These and other features and advantages of the present invention will become more apparent from the following detailed description of an exemplary embodiment thereof, as illustrated in the accompanying drawings, in which:

FIG. 2A shows an exemplary implementation of a programmable node system in accordance with an aspect of the invention.

FIG. 2B illustrates one exemplary set of switch settings for the programmable node system of FIG. 2A.

DETAILED DESCRIPTION OF THE PREFERRED EMBODIMENTS

Figure 1:
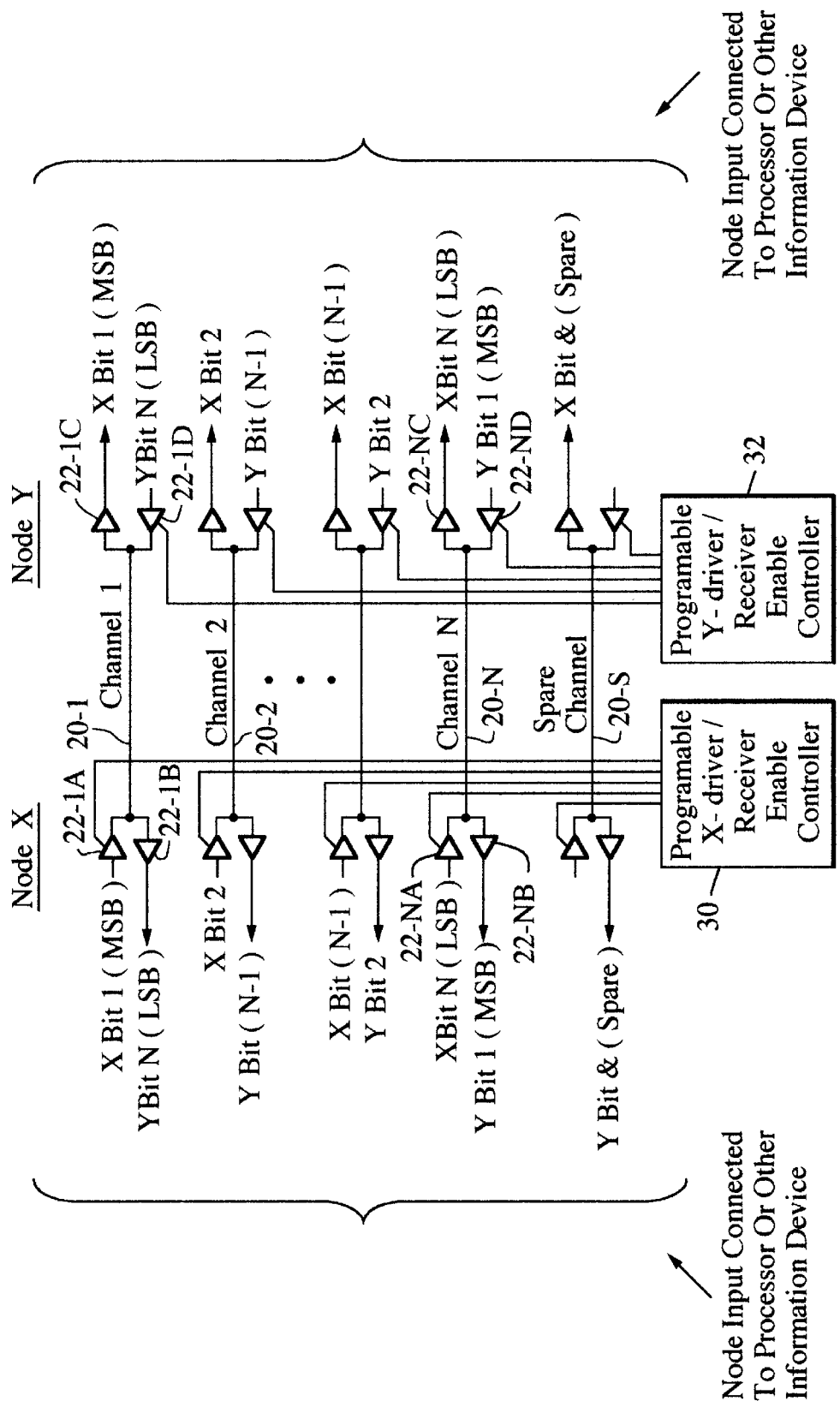
FIG. 1 is a schematic diagram illustrating N channels connecting two respective sources/designations.

FIG. 1 is a schematic diagram illustrating N bidirectional communication channels 20-1, 20-2, . . . 20-N, connecting two sources/destinations, labeled "Node X" and "Node Y". Also shown is an exemplary additional, spare channel 20-S. Each channel includes I/O drivers or receivers at each channel terminal.

Thus, for example, channel 20-1 includes driver 22-1A and receiver 22-1B at the channel terminal connected to Node X, and driver 22-1D and receiver 22-1C at the channel terminus connected to Node Y. Driver 22-1A is used for send operations at node X, and receiver 22-1B is used for receive operations. Similarly, receiver 22-1C is used for receive operations at node Y, and driver 22-1D is used for send operations at node Y.

The particular driver device for sending and receiving are selected in dependence on the particular transmission media being used for the communication path. For example, for electrical or optical communication paths, electrical or optical line drivers/receivers could be employed. For wireless communication links, radio modulator/demodulators could be employed for the driver functions.

A common application employs the channels to convey the digital bits of a multi-bit, binary-encoded word. Each channel is assigned to one bit level of a multiple-bit word, starting at a most-significant-bit (MSB) and ending at a least-significant-bit (LSB).

When X sends and Y receives, they both use the convention of most-significant-bit (MSB) on channel 20-1 and least-significant-bit (LSB) on channel 20-N. Thus, the output at driver 22-1A is $X_{bit\ 1}$(MSB), and the output at driver 22-NA is $X_{bit\ N}$(LSB). Conversely, when Y sends and X receives, the bit allocation is reversed, MSB on channel 20-N and LSB on channel 20-1. Thus, the output of driver 22-1D is $Y_{bit\ N}$(LSB), and the output at driver 22-ND is $Y_{bit\ 1}$(LSB).

The I/O driver and receiver settings are programmable On/Off, and are controlled by respective X-driver and Y-driver enable controllers 30, 32. In operation, for full bandwidth from X to Y (all N bits), the node X send drivers and the node Y receivers are all set to On, and the node Y send drivers and the node X receivers are all set to Off by the controllers 30, 32.

For N−1 bit operation from node X to node Y (bandwidth=(N−1)/N of maximum) and 1 bit from Y to X (bandwidth=1/N of maximum), the X drivers for channels 20-1 through 20-(N−1) are On, the Y driver for channel 20-N is On, the X receivers for channels 20-1 through channel 20-(N−1) are Off, and the Y receiver for channel 20-N is Off.

The progression of options continues to reduce the number of active X drivers by one and increase the number of active Y drivers by one (from channel N−2 progressively toward channel 1). The options terminate when all Y drivers are On and all X drivers are Off (full bandwidth, Y to X). TABLE A shows an exemplary example of the options for a four-channel system.

TABLE A

EXAMPLE OF OPTIONS FOR 4 CHANNELS

| X to Y | | Y to X | |
|---|---|---|---|
| Bits sent | Bandwidth | Bits sent | Bandwidth |
| $X_0X_1X_2X_3$ | Full | None | 0 |
| $X_0X_1X_2$ | 3/4 | $Y_0$ | 1/4 |
| $X_0X_1$ | 1/2 | $Y_0Y_1$ | 1/2 |
| $X_0$ | 1/4 | $Y_0Y_1Y_2$ | 3/4 |
| None | 0 | $Y_0Y_1Y_2Y_3$ | Full |

In many cases, the disposition of the designation of a node (as X or Y type) cannot be defined a priori. In this case the designation is made programmable.

An example of the use of programmable designation of bit ordering is the use of common processor nodes in a multi-processor interconnection fabric. For example, consider nodes X and Y of FIG. 1 to each be coupled to identical processors in a simple multiprocessor system having two processor nodes. It is desirable to construct nodes X and Y as identical circuit card assemblies, which could be plugged into connectors to each channel. Note that for the particular embodiment illustrated in FIG. 1, different circuit card assemblies would be needed for node position X and node position Y. The MSB from the processor in position X must connect to driver 22-1A. If the circuit card were plugged into position Y, then the same driver (connecting to channel 1)) becomes driver 22-1D, and must come from the LSB of the processor, i.e. a different circuit card layout.

The circuit card assemblies for positions X and Y can be made identical, by including circuitry which programmably reverses the bit ordering of the processor connections to the physical drivers and receivers, depending on the physical location of the circuit card assembly. This is illustrated in FIGS. 2A–2B.

FIG. 2A shows an exemplary implementation of a programmable node system or circuit card assembly 50 in accordance with an aspect of the invention, which allows the same node system to be used as a node X or a node Y circuit card assembly. The node 50 includes four I/O ports 52–58, each connected respectively to a corresponding I/O driver/receiver set 62A/B–68A/B, a set of node output terminals $O_1$–$O_4$, and a set of node input terminals $I_1$–$I_4$. The driver and receiver states are programmable On/Off as in FIG. 1; the driver/receiver controller 92 controls the states of the drivers and receivers.

The I/O port 52 can be connected to the communication channel 1, port 54 to channel 2, port 56 to a channel 3 and port 56 to a channel 4, using the same channel numbering convention as employed in FIG. 1.

A switch system can be set to reverse the bit ordering of either receive (X type) or send (Y type). This is illustrated in FIG. 2A, where port 52 in a normal order is assigned the MSB, and port 58 the LSB. In a reverse order, port 58 is assigned the MSB and port 52 the LSB. Thus, one side or pole of switches 72–78 is connected to a respective input of send drivers 62A, 64A, 66A and 68A. The switchable X and Y sides or poles of the switches 72–78 are respectively connected to corresponding MSB/LSB bit terminals $O_1$–$O_4$ of the node output; each output terminal is connected to a X side of one switch and a Y side of another switch, to allow the bit ordering at terminals $O_1$–$O_4$ to be reversed for send operations. One side or pole of single-pole-double-throw (SPDT) switches 82–88 is connected to a respective node input terminal $I_1$–$I_4$ of the node input. The switchable X and Y sides or poles of the switches 82–88 are connected to respective outputs of receivers 62B–68B; each input terminal is connected to a X side of one switch and a Y side of another switch, to allow the bit ordering at terminals $I_1$–$I_4$ to be reversed for send operations.

The switches 72-78 and 82-88 can typically be implemented in digital logic, although other forms of switches can alternatively be employed.

A switch control 90 is connected to the switches 72–78 and 82–88 to control the switch positions. FIG. 2B illustrates one exemplary set of switch settings for the programmable node 50. For send operation in an X node sense, wherein data at the node output terminals $O_1$–$O_4$ is sent out over the communication channels, the switches 72–78 are set to the X position for normal operation, so that output terminal $O_4$ is the LSB, and output terminal $O_1$ is the MSB. For send operation in the Y node sense, i.e. the reverse sense, the switches 72–78 are set to the Y position, and now $O_4$ is the MSB, and $O_1$ is the LSB. The switch settings for switches 82–88 are "don't care" for the full send operations.

Similarly, for receive operation in the Y node sense, i.e. the normal operation to receive from an X node sender, the switches 82–88 are set to the Y position, and terminals $I_1$ and $I_4$ provide MSB and LSB, respectively. For receive operation in the X node sense, i.e. the reverse operation to receive from a Y node sender, the switches 82–88 are set to the X position, and now 14 is MSB, and $I_1$ is LSB. The switch settings for switches 72–78 are "don't care" for the full receive operations.

All N bits are available for both node output and node input. For send, only the "top" S bits are used, starting at MSB (bit 1) through bit S; for receive, only the top R bits (bit 1(MSB) through bit R) are used (where S+R=N). The unused output bits are "don't care"; the unused input bits may be set to any required default (typically to zero for unsigned magnitude data and to the sign bit ("MSB") value for two's compliment data).

In the two node processor system case, where respective circuit card assemblies 50 are connected to the respective X and Y nodes on the opposite sides of the communication channels, one circuit card assembly is set to one configuration (X or Y), and the other circuit card assembly is set to the opposite (Y or X) configuration.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A programmable node system for connection to I/O ports of a duplex communication path comprising N communication channels, each channel having at least first and second I/O ports, and wherein data transmission from said first I/O port to said second I/O port follows a normal bit order, and data transmission from said second I/O port to said first I/O port follows a reverse bit order, the node system comprising:

a plurality of node I/O ports, each connected respectively to a corresponding node I/O driver/receiver set, and wherein the driver and receiver states are programmable On/Off by a driver/receiver controller;

a set of node output terminals;

a set of node input terminals;

a programmable switch system for coupling the set of node output terminals and the set of node input terminals to the node I/O driver/receiver sets to set to the bit ordering of either the normal bit order or the reverse bit order, and wherein said normal bit order follows a most significant bit (MSB) to a least significant bit (LSB) order from a first one of said N channels to the Nth channel, and said reverse list order follows an LSB to MSB order from the Nth channel to said first of said N channels.

2. The system of claim 1 wherein the programmable switch system includes a first set of switches coupling each of said node output terminals to two respective drivers of said I/O driver sets, said first set of switches programmable to select the respective driver to be coupled to the node output terminal to set the node output states to either a normal bit order or a reverse bit order.

3. The system of claim 1 wherein the programmable switch system includes a second set of switches coupling each of said node input terminals to two respective receivers of said I/O driver/receiver sets, said second set of switches programmable to select the respective receiver to be coupled to the node I/O ports to set the node input states to either a normal bit order or a reverse bit order.

4. The system of claim 1, wherein said plurality of node I/O ports, said set of node output terminals, said set of node input terminals, and said programmable switch system are fabricated as a circuit card assembly connectable to either of said I/O ports of said communication channels and configured for either said normal bit order or said reverse bit order.

* * * * *